(12) United States Patent
Golden et al.

(10) Patent No.: US 7,433,332 B2
(45) Date of Patent: Oct. 7, 2008

(54) MANAGED MICROCELL WIRELESS MESH NETWORK ARCHITECTURE

(75) Inventors: Michael Golden, Sedona, AZ (US); William Blair, San Diego, CA (US)

(73) Assignee: SkyPipes Wireless, Inc., Sedona, AZ (US)

( * ) Notice: Subject to any disclaimer, the term of this patent is extended or adjusted under 35 U.S.C. 154(b) by 649 days.

(21) Appl. No.: 10/835,265

(22) Filed: Apr. 30, 2004

(65) Prior Publication Data

US 2005/0094585 A1 May 5, 2005

Related U.S. Application Data

(60) Provisional application No. 60/467,636, filed on Apr. 30, 2003.

(51) Int. Cl.
*H04Q 7/36* (2006.01)
*H04L 5/00* (2006.01)

(52) U.S. Cl. ............. 370/328; 370/401; 455/193.1

(58) Field of Classification Search ......... 370/312, 370/328, 400, 401, 389, 390, 432; 455/13.3, 455/19, 25, 115, 129, 193.1
See application file for complete search history.

(56) References Cited

U.S. PATENT DOCUMENTS

| | | | | |
|---|---|---|---|---|
| 5,767,807 | A * | 6/1998 | Pritchett | 342/374 |
| 6,426,814 | B1 | 7/2002 | Berger et al. | |
| 6,441,782 | B2 * | 8/2002 | Kelly et al. | 342/359 |
| 6,473,036 | B2 * | 10/2002 | Proctor, Jr. | 342/372 |
| 6,486,832 | B1 | 11/2002 | Abramov et al. | |
| 6,493,377 | B2 | 12/2002 | Schilling et al. | |
| 6,671,495 | B1 * | 12/2003 | Lappetelainen et al. | 455/67.11 |
| 6,671,819 | B1 * | 12/2003 | Passman et al. | 714/4 |
| 6,714,787 | B2 | 3/2004 | Reed et al. | |
| 6,728,514 | B2 | 4/2004 | Bandeira | |
| 7,085,541 | B2 * | 8/2006 | Redi et al. | 455/69 |
| 7,139,262 | B1 * | 11/2006 | Elliott | 370/351 |

(Continued)

OTHER PUBLICATIONS www.wimax.org, IEEE 802.16a Standard and WiMAX Igniting Broadband Wireless Access—White Paper, obtaining from Internet on Apr. 12, 2004.

(Continued)

*Primary Examiner*—Wing F. Chan
*Assistant Examiner*—Duc T Duong
(74) *Attorney, Agent, or Firm*—Crowell & Moring LLP

(57) ABSTRACT

A wireless network with tiered centralized control is provided. The wireless network includes a controlling node and a plurality of participant nodes. Each participant node includes an electronically steerable antenna. The plurality of participant nodes report various network information to the controlling node, such as interference and throughput measurements. The controlling node examines the network topology and provides instructions to one or more participant nodes in order to optimize the network. The instructions can include transmit and receive antenna pointing directions, assigned frequency/channel, and the amount of transmit power to use between specific participant nodes. The optimization of the network is performed to deterministically manage the capacity and reliability of the network by managing the multi-hop paths of the network so that no single path becomes congested while other paths within the network remain underutilized and to heal the network by creating new physical layer and logical layer paths around unexpected obstacles, interference, and/or broken nodes.

18 Claims, 5 Drawing Sheets

U.S. PATENT DOCUMENTS

| | | | |
|---|---|---|---|
| 7,321,580 B1 * | 1/2008 | Ramanathan et al. | 370/339 |
| 2002/0094823 A1 * | 7/2002 | Suzuki et al. | 455/456 |
| 2003/0119558 A1 * | 6/2003 | Steadman et al. | 455/562 |
| 2003/0195005 A1 * | 10/2003 | Ebata | 455/445 |
| 2004/0236547 A1 * | 11/2004 | Rappaport et al. | 703/2 |

OTHER PUBLICATIONS

WiMAX Technical Information, Overview of IEEE 802.16, p. 1-3 obtained from Internet on Apr. 12, 2004.

International Search Report and Written Opinion for PCT/US05/14858 dated Sep. 12, 2007.

* cited by examiner

MANAGED MICROCELL WIRELESS MESH NETWORK ARCHITECTURE

This application claims the benefit of priority under 35 U.S.C. § 119(e) to Provisional Application No. 60/467,636, filed Apr. 30, 2003.

BACKGROUND OF THE INVENTION

The present invention is directed to enabling wireless networks to serve the delivery of local loop voice, video and data services, primarily by increasing the bandwidth density of said wireless networks. More specifically, the present invention is directed to increasing the performance of wireless transmission by improvements primarily but not limited to, bandwidth density and reliability, using primarily, but not limited to, centralized control, spatial radiation control, and tiered messaging architecture. Bandwidth density is the amount of unique simultaneous traffic that can be delivered to a body of subscribers in a given geographical area.

Deregulation of the communications industry has allowed communications companies to compete in areas where they were previously prohibited from competing. This has resulted in telephone companies offering high speed data communications and television programming in addition to their traditional voice communications products. Likewise, cable companies offer voice and high speed data communications over their existing cable infrastructure. The cost of upgrading existing cable and telephone networks has been passed on to customers in the form of higher monthly bills. Cable and telephone companies can raise customers' monthly bills with little concern for losing customers because the costs a potential competitor would incur for building a new wired infrastructure to compete with existing cable and telephone companies is prohibitively expensive.

Currently wireless companies are attempting to provide a bundle of communications services over cellular networks. For example, some wireless companies are providing high speed data and video communications over their cellular networks. Providing high speed data and video communications over cellular networks requires massive upgrades to conventional voice cellular networks. Even after the massive upgrades, the actual bandwidth density achievable in these upgraded cellular networks is much lower than that of existing wired infrastructures and typically not sufficient to deliver digital television signals, digital telephone service, and high-speed internet access simultaneously to a large body of users. This is due in part to the self-interfering nature of conventional cellular networks and the fact that each cellular tower must cover a large service radius and divide up its available throughput among a large number of potential users for the cost per user to even approach acceptable levels. Because of the high cost of the upgrades and the limited bandwidth density provided by the cellular architectural model, high speed wireless data and video communications are used mostly by business users, as they are the ones with the ability to pay the high bills associated with such services.

Existing cellular networks are based on a point-to-multipoint communications model. Specifically, a base station (i.e., the point) serves a number of mobile stations (i.e., the multi-point) in a particular cell. The bandwidth that can be provided by a particular cell is limited, and must be divided among all of the mobile stations in a particular cell. Accordingly, the more mobile stations in a particular cell, the less amount of bandwidth which can be allocated to a particular mobile station. Additionally, each cell in a cellular network produces interference to other proximately located cells in the network, and each mobile station produces interference to other mobile stations. This cell-to-cell interference is typically mitigated by using different frequency assignments for adjacent cells further increasing the cost and complexity of using the cellular model.

The potentially large distances between a cell tower and a mobile station can result in numerous obstacles and sources of interference which can limit or eliminate the throughput between the tower and the mobile station. This makes the certainty and the speed of a connection unpredictable and unreliable especially for mobile stations that are located a significant distance from the central tower. All of these factors further reduce the total bandwidth which can be provided by a base station in a particular cell especially on the return path when a mobile station is sending to a cell tower. For these reasons most consumer services are configured as asymmetrical services in which much less bandwidth is provided upstream than downstream toward the user.

Others have attempted to overcome the bandwidth density limitations of point-to-multipoint wireless architectures by designing so-called mesh architectures. With these designs many low power radio transceivers are placed in proximity to each other such that each radio's signal can be received by a plurality of other radios. The radios are each equipped with store-and-forward routing capability such that each radio that receives a packet of traffic can at some point forward it to another radio which forwards it in turn to its eventual destination.

One problem of typical mesh architecture is that any radio that wishes to send must wait until all other radios in the mesh network within its range are not sending. This results in most radios in a large mesh network being in a waiting-to-send state more than a sending state. The large amount of time in the waiting-to-send state severely reduces average throughput for each node in the network and results in poor overall bandwidth density performance for the network as a whole. Attempts have been made to mitigate the self interference and increase the practical distances between nodes in mesh networks by equipping each node in the mesh with multiple directional antennas and physically aiming those antennas at specific other nodes in the network. Although this can improve mesh network performance it is costly and operationally complex to physically aim and re-aim the antennas as nodes are added and deleted from the network and changing environmental conditions affect the throughput performance between individual nodes.

SUMMARY OF THE INVENTION

Exemplary embodiments are directed to centralized control of wireless networks. A controlling node examines the network topology based on information detected by, and sent to, the controlling node from each participant node in the network. The central node provides instructions to one or more participant nodes in order to optimize the performance of each node and the entire network. The instructions from the controlling node are stored locally in each participant node until updated by the controlling node and can include ranked preferences for transmit and receive antenna pointing directions, possible channel/frequency assignments, and the optimal amount of transmit power to use when sending to a specific receiving participant node. By storing the instructions locally a participant node can react quickly to detected changes in the network environment without needing to wait to receive direct instructions from the controlling node. In due course the controlling node can re-optimize the network assignments and send them to the participant nodes affected.

The optimization of the network is performed to deterministically manage the capacity and reliability of the network by managing the multi-hop paths of the network so that no single path becomes congested while other paths within the network remain underutilized. This allows the network to "heal" itself around unanticipated losses of participant nodes, signal blockage on a particular path, etc. Typically, network nodes of multi-hop networks have routers that only know about immediately adjacent routers, and hence, these networks cannot achieve the load balancing provided by the centralized control disclosed herein and can only provide "best effort" throughput performance and therefore low levels of bandwidth density since a particular node has no way of foreseeing throughput limitations more than one hop away from itself.

A further aspect of the invention is the incorporation of a packet processor in each participant node that examines each arriving packet and determines if the packet is intended for the particular participant node or if it is to be forwarded to another participant node. If the packet is to be forwarded a processor examines the participant node's local table which stores parameters sent from the controlling node. The packet processor then uses this information to forward the packet in the desired direction by aiming the antenna, optionally selecting the frequency/channel to be used, and adjusting the power level to be used for sending the packet to the specified receiver. The use of this bridge/router processor in concert with the network optimizing information stored in the node significantly reduces the latency of forwarding packets through the network and thereby further improves throughput of the network and it's bandwidth density.

The use of many centrally coordinated electronic steerable beam antennas to compose a grid of dynamically switched wireless connections reuses available assigned spectrum very efficiently. This is so because groups of antennas that are arranged to point at each other will tend to not interfere with other groups of antennas in the same network so long as the antennas in one group are pointed away from the other groups. This creates managed isolated spatial subnets in which the same frequency can be used multiple times simultaneously to carry many times the total traffic that could be handled by a single tower in a point-to-multipoint architecture.

A further aspect of the invention is the incorporation of tiered control plane which works in concert with the elements of the system to allow time based decisions to be handled without undue overhead in messaging. The tiered management allows the participant nodes to make policy or route decisions in the microseconds or within the time functions of packet preambles, the anchor point to make millisecond decisions for network routing and traffic optimization, and a network operations center to make decisions over seconds which may populate tables for decisions in the participant nodes.

A further aspect of the invention is the incorporation of subnets wherein the addressing schema is based on private subnets per node set or link chain and bridged at the controlling node to allow for peer to peer data passage between neighbors. Customer LAN interfaces are further isolated by network address translation and port address translation as well as encryption to prevent unwanted peer to peer traffic.

BRIEF DESCRIPTION OF THE DRAWINGS

The present invention will now be described with reference to the accompanying drawings in which.

DETAILED DESCRIPTION

Figure 1:
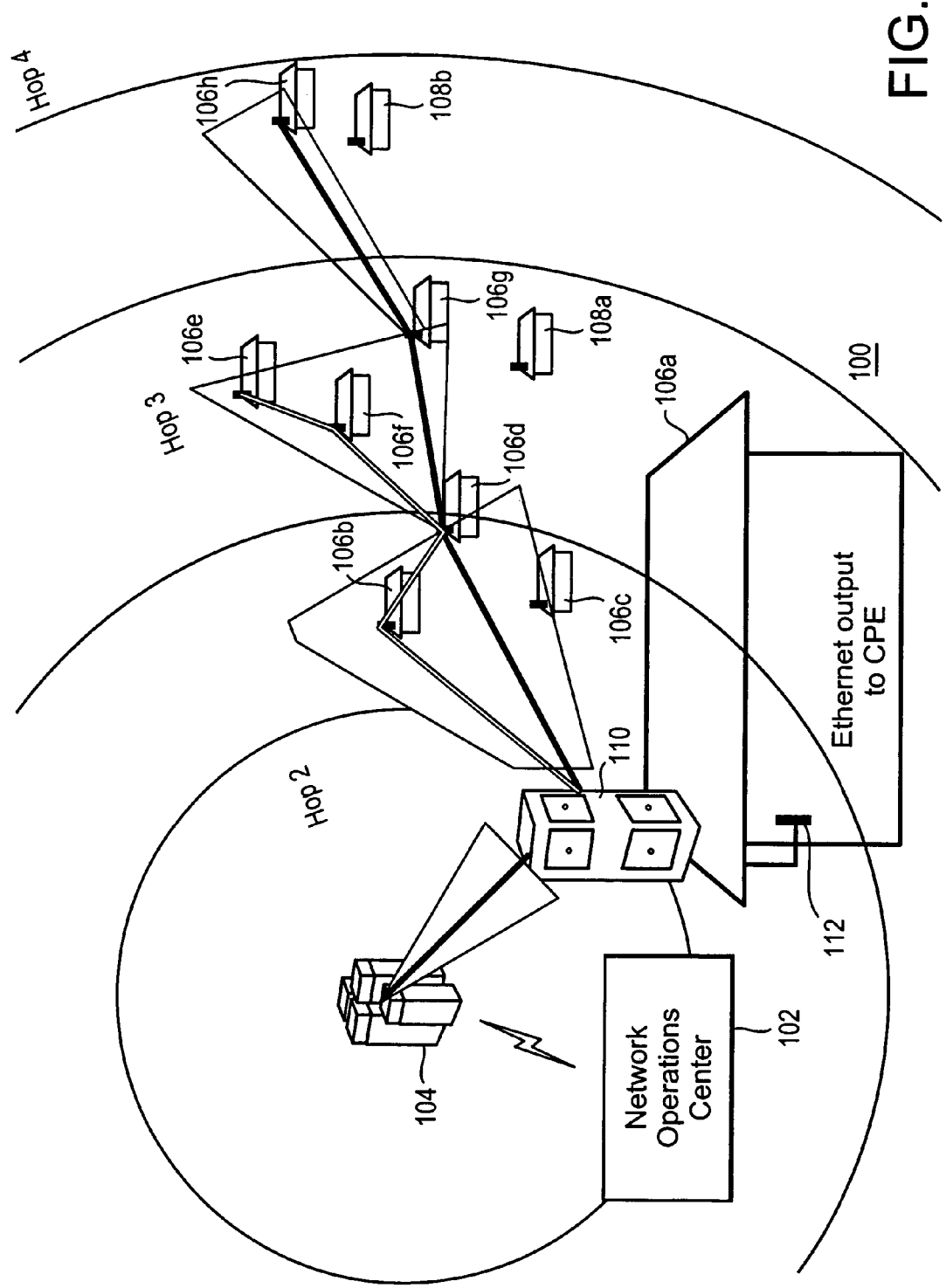
FIG. 1 illustrates a network in accordance with exemplary embodiments.

FIG. 1 illustrates a network 100 in accordance with exemplary embodiments. The network includes a network operations center 102, an anchor point 104, and a plurality of subscriber nodes 106a-106h (herein referred to as participant nodes). Participant node 106h can be referred to as a "leaf" participant node because it has only one connection to the network which is used for both transmitting and receiving packets. Also illustrated in FIG. 1 is a plurality of non-subscribers premises 108a and 108b, the non-subscriber premises are not part of the network. Each participant node includes an electronically steerable-beam antenna and a participant controller 110 (illustrated in FIG. 1 as a single element), and indoor unit 112 for connection to the customer premises equipment (CPE) such as a computer, telephone and television.

The anchor point 104 provides a connection between the network 100 and other communications networks such as cable or satellite television networks, the public switched telephone network (PSTN) and the Internet. The wireless communication links between various nodes can be provided using any number of different wireless technologies including 802.11a, 802.11g, 802.16 and the like. Additionally, subject to governmental regulations, the wireless communication links can occur over any arbitrary frequency spectrum. The wireless communication links between the nodes can be a circuit-switched connection or a packet-switched connection. The wireless communication links can provide a data transfer rate of approximately 4 to 30 megabits per second for each participant node. Because of the reduction of self-interference achieved by creating high gain links by electronically aiming directional node antennas at each other using centralized control, connection technologies such as 802.11g can dynamically link participant nodes at distances many times greater than is typically provided, e.g., a link between nodes can be as great as one mile.

A controlling node receives information from the participant nodes 106a-106h and provides network optimization instructions to each of the participant nodes 106a-106h to control the topology of the network. The controlling node can be located either at the network operations center 102 or at the anchor point 104. The controlling node provides each participant node 106a-106h with a direction for the electronically steerable-beam antenna to receive information from downstream participant nodes and a direction for the electronically steerable-beam antenna to transmit information upstream to participant nodes or the controlling node. The controlling node can also provide a second and third set of upstream and downstream directions for each of the plurality of participant nodes 106a-106h. Spatial reuse is achieved by providing antenna pointing directions from a controlling node to the participant nodes which creates bandwidth density by reducing self-interference from other nodes which are not part of a dynamically defined spatial subnet. Moreover, the centralized control of antenna pointing directions provides self-healing and interference avoidance functions, and results in optimized Layer-1 network performance.

In accordance with exemplary embodiments the network supports four participant node hops from the anchor point 104. Additionally, the network employs Internet Protocol (IP) addressing using subnet addressing for a particular node chain. A node chain comprises a plurality of serially arranged nodes between the anchor point 104 and a participant node on the edge of the network. In FIG. 1 participant nodes 106a, 106d, 106g and 106h form a node chain. The use of subnet addressing for node chains reduces latency of packets communicated between nodes of a particular node chain. Without subnet addressing, packets between two nodes of a particular node chain would have to travel through the chain to the anchor point 104 which would route the packets back to the particular participant node in the node chain. The reduced latency achieved using subnet addressing is useful for transferring video between participant nodes of a node chain, or for transferring data related to real-time games between participant nodes of a node chain.

The network can employ Multiprotocol Label Switching (MPLS) for routing packets between nodes. Employing MPLS results in the controlling node being both the ingress and egress Label Switch Router (LSR). Accordingly, the controlling node imposes the label stack for incoming packets and disposes of labels for outgoing packets. Each participant node can act as an LSR and can make forwarding decisions based solely on the contents of the label. Security for the network can be employed using IPSec, Virtual Private Network (VPN) encryption in Layer-3 compatibly with MPLS. The label switched paths can be applied to guarantee a certain level of performance, to route around network congestion, or in conjunction with IP tunnels for network-based virtual private networks. The network can employ other types of label switching, or a modification of MPLS.

Figure 2:
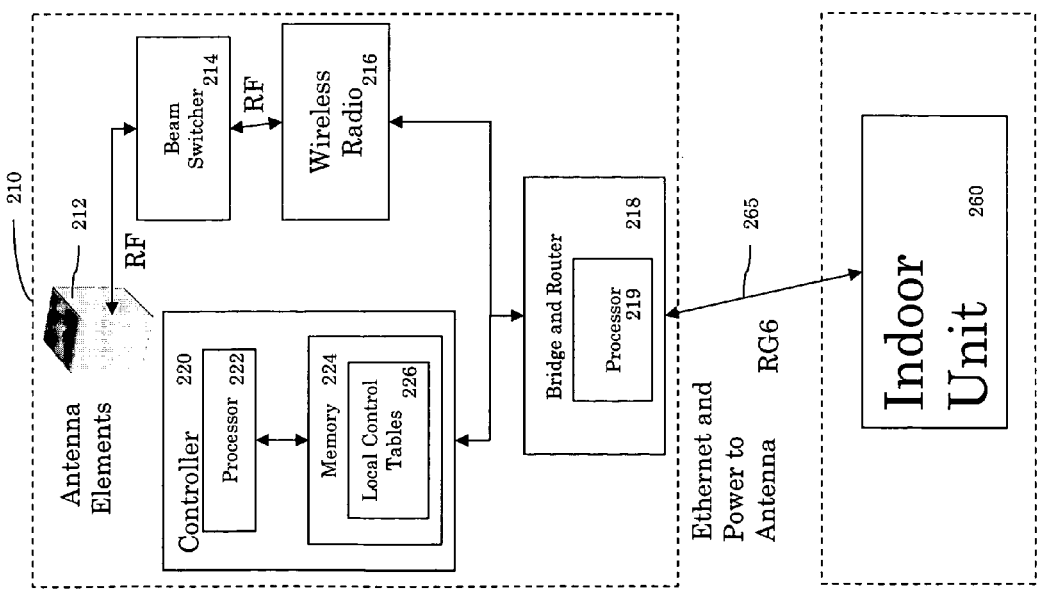
FIG. 2 illustrates an exemplary participant node.

FIG. 2 illustrates an exemplary participant node 200. The participant node includes a rooftop unit 210 and an indoor unit 260. The indoor unit 260 provides connections to the CPE such as Ethernet for computer data, coaxial for video, twisted pair for telephony, and the like. The system can also operate using an outdoor unit instead of an indoor unit. For example, an outdoor unit can be connected to the main telephone connection into a premises of a participant node. The main telephone connection can provide data, video and telephony over the existing telephone wiring using the Home Phoneline Network Alliance (HPNA) technologies. Alternatively, the outdoor unit can be connected to the main electrical line into the premises which can provide data, video and voice over the existing electrical wiring of the premise using PowerPlug technologies. As another alternative, a wireless LAN base station can be used to distribute the data inside the subscriber's premise. The indoor unit is connected to the rooftop unit over communications link 265, which carries data and power between the indoor unit 260 and rooftop unit 210 and provides power from the subscriber's premise to the rooftop unit 210. The communications link 265 can be an RG6 cable or the like.

The rooftop unit 210 includes antenna 212, a beam switcher 214, a wireless radio 216, a bridge and router 218, and a controller 220. Antenna 212 can be a solid state antenna. Moreover, the antenna 212 can be designed to minimize its size. Antennas which can be used with the disclosed system can have a height of approximately 10 inches. The beam switcher 214 individually controls which of the various beams of antenna 212 are active for transmission and reception. The beam switcher 214 can dynamically focus energy, i.e., transmit, in the direction of another participant node within approximately 26 microseconds. The fast switching time of the beams of antenna 212 allows the network to quickly react to changes in the network such as interference, congestion, or a lost connection. The wireless radio 216 can operate using any number of wireless technologies including 802.11a, 802.11g, 802.16, and the like, or can rely on proprietary radio technologies.

The bridge and router 218 includes a processor 219. Processor 219 can be a microprocessor, an application specific integrated circuit (ASIC), a field programmable gate array (FPGA), or the like. An advantage of using an ASIC or FPGA over a microprocessor is the speed at which the packets can be examined to determine whether they are intended for the participant node or should be forwarded to a next participant node in the network. Specifically, a fast hashing algorithm can be programmed in the ASIC or FPGA to examine the packets at the radio packet layer for specific packet header information such as destination address. Conventional techniques which employ processor 222 to perform such a function by examining at the base TCP/IP stack would introduce a delay into the forwarding of packets due to the inherent fetch-write cycles.

The controller 220 includes a processor 222 and memory 224. The processor 222 can be implemented as a microprocessor running a stored program, an ASIC, or the like.

The memory 224 stores, among other things, the local control tables 226. The local control tables are initially provided by the controlling node to each participant node. Each local control table contains an antenna pointing direction for receiving packets, and an antenna pointing direction and power level for transmitting packets. The control of transmit power level is provided so that a transmitting node uses just enough power to achieve acceptable signal-to-noise performance and optimal throughput when transmitting to a specific node but not more power than necessary, which would unnecessarily raises the noise floor for other nodes in the network. The participant nodes uses the local control tables to make instantaneous routing decisions. The controlling node uses the information obtain from the participant nodes to provide information to each participant node to update its local control table.

To provide increased reliability for the network, the local control table can include a second and third set of antenna pointing directions and associated transmission power levels which are to be used if the first set of antenna pointing directions cannot be used due to, for example, a broken link to one of the other participant nodes. The local control table can be implemented in various forms such as a modified Open Shortest Path First (OSPF) routing protocol. OSPF can be modified to compare the shortest path against other paths using the criteria of several variables optimized against a traffic model. The variables can include, but are not limited to, the signal-to-noise ratio of a path, the power level used for the path, and the Medium Access Control (MAC) destination address.

When a source of temporary interference occurs between a participant node and another participant node from which it is to receive packets the participant node consults its local control tables for a second receive antenna pointing direction so that network continuity is maintained. Similarly, the participant node which is transmitting to this participant node from the direction of the first antenna receive pointing direction will attempt to use a second transmit antenna pointing direction to maintain network continuity. If the participant node has an acceptable communication link it will continue to use the first transmit antenna pointing direction while using the second receive antenna pointing direction.

Whether a communication link is an acceptable communication link depends on the amount of bandwidth provided by the communication link. The amount of bandwidth can be a predetermined fixed value determined based a minimum amount of bandwidth to provide voice, video and data communications for the maximum number of participant nodes in a node chain. Alternatively, the amount of bandwidth can be determined based on particular conditions for a participant node. For example, a leaf participant node can require much less bandwidth than a participant node connected directly with the anchor point because the leaf participant node only requires bandwidth to support communications for itself, while the participant node connected directly to the anchor point requires bandwidth to support communications for all active participant nodes in the node chain. Moreover, the amount of bandwidth can be based on the type of services provided to participant nodes. For example, a leaf participant node which subscribes to only voice services requires much less bandwidth than one which subscribes to voice, data and video services.

The participant node will continue to use the first transmit and second receive antenna pointing directions until it receives a new set of antenna pointing directions from the controlling node, the first transmit antenna pointing direction does not provide a link to the desired participant node, the second receive antenna pointing direction does not provide a link to the desired participant node, or the interference in the first receive antenna pointing direction has abated such that a link can be established to the desired participant node in the first receive antenna pointing direction.

Figure 3:
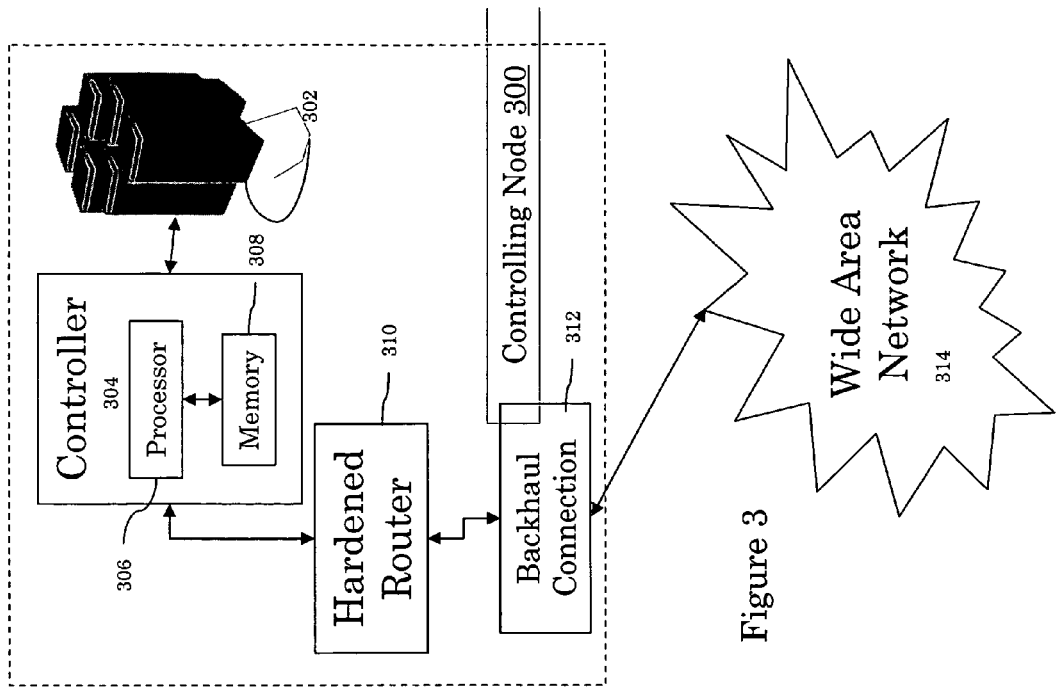
FIG. 3 illustrates an exemplary controlling node.

FIG. 3 illustrates an exemplary controlling node 300. In the embodiment illustrated in FIG. 3 the anchor point is the controlling node. However, as discussed above, the controlling node can be located in the network operations center, which in FIG. 3 would be connected to the anchor point over the wide area network 314. In accordance with exemplary embodiments, an anchor point can support approximately 500 participant nodes. The anchor point includes a plurality of antenna/radio elements 302, controller 304 and a hardened router 310. In exemplary embodiments the antenna/radio elements 302 create a six sectored traffic aggregation point, aggregating traffic from up to a four mile service area. It will be recognized that a greater or lesser number of sectors can be employed using more or less antenna/radio elements to compose the anchor point.

The controller 304 includes a processor 306 and memory 308. The controller 304 includes control plane software for radio performance monitoring, aiming algorithms, path load balancing, link layer assignments, Voice over Internet Protocol (VoIP) Quality of Service (QoS) management interface response, lost participant node recalculation, network VPN termination, controller failover and network control plane. Processor 306 can be a microprocessor, ASIC, or the like.

The memory 308 stores, among other things, a route management table which contains the network topology along with control information received from the participant nodes. The controller 304 controls the assignment of physical (layer 1) and logical (layers 2 & 3) paths used for the forwarding of packets between the participant nodes of the network and to the wide area network 314, which can be, for example, the Internet. Additionally, the wide area network can comprise the PSTN and/or a connection to a video provider such as a cable or satellite television provider.

The hardened router 310 is a conventional router with the additional capabilities of signing and verifying packets, encrypting and decrypting packets, providing traffic statistics, and filtering and restricting packets. The hardened router provides an additional layer of security to the network. The hardened router forwards packets between the local network and the wide area network 314 over backhaul connection 312. Depending upon the amount of traffic forwarded between the local network and the wide area network, the backhaul connection 312 can be one or more T1 or T3 connections or greater, or the like.

Figure 4:
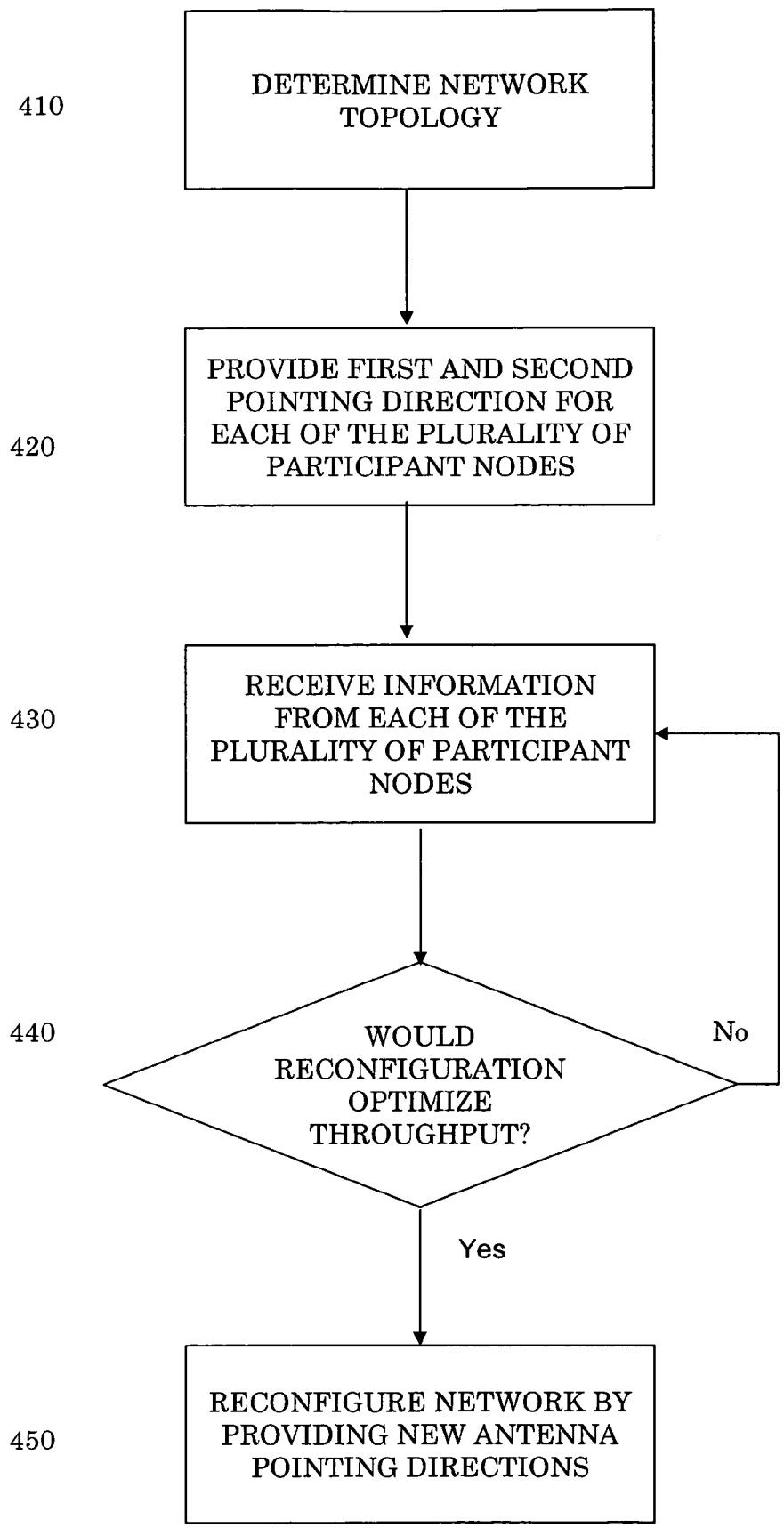
FIG. 4 illustrates an exemplary method for centralized control of a wireless network.

FIG. 4 illustrates an exemplary method for centralized control of a wireless network. The controlling node determines the network topology (step 410). When the network is first set up the controlling node can be provided with an initial network topology which is based on computer simulations of the most efficient network topology. Once the network is operating the network topology can be determined by accessing a stored topology which is based on a previously determined network topology. Based on the determined network topology the controlling node provides at least first (transmit) and second (receive) antenna pointing directions for each of the plurality of participant nodes (step 420). The controlling node can also provide a transmit power level associated with the first antenna direction. Additionally, the controlling node can provide a second and third set of first and second antenna pointing directions and an associated transmit power level.

The controlling node receives information from each of the plurality of participant nodes (step 430). Specifically, each of the plurality of participant nodes transmits information over a control channel which is routed through the network back to the controlling node. The control channel can be a physically different channel than the traffic channel, e.g., a different frequency, or it can be a logical channel (routed path) which shares the same physical channel as the traffic channel. The information which each of the plurality of nodes transmits includes the amount of traffic being forwarded by the particular node, a signal-to-noise ratio value of other participant nodes which the particular participant node can "see" (i.e., those participant nodes for which the particular participant node can actually detect signals transmitted by the participant nodes over the ambient noise), and an estimate of the noise present between the particular participant node and the other participant nodes which the particular node can see. Additionally, the controlling node can instruct any two of the participant nodes to transfer test traffic to determine an actual signal-to-noise ratio and the resultant throughput between the two participant nodes. The control channel can employ security by encryption of packet headers, payload or both.

Using stored information about the network topology, including the amount of power being used to transmit between participant nodes and the information received over the control channel, the controlling node determines whether throughput, i.e., the amount of bandwidth and delay, can be optimized by reconfiguring the network (step 440). If the controlling node determines that the network topology is already optimized for throughput, ("No" path out of decision step 440), then the controlling node continues to receive information from each of the plurality of participant nodes (step 430).

If the controlling node determines that reconfiguration of the network would optimize throughput, ("Yes" path out of decision step 440), then the controlling node reconfigures the network by providing new antenna pointing directions to at least two participant nodes. The new antenna pointing directions are provided to two nodes because one node must use a new antenna pointing direction for transmission and a corresponding participant node must use a new antenna pointing direction to receive the transmission. Alternatively, or additionally, the controlling node can reconfigure the network by adjusting transmission power levels of one or more of the participant nodes. If the network provides at least two physical channels, e.g., two separate frequency bands, the controlling node can reconfigure the network by instructing at least two participant nodes to change physical channels.

Figure 5:
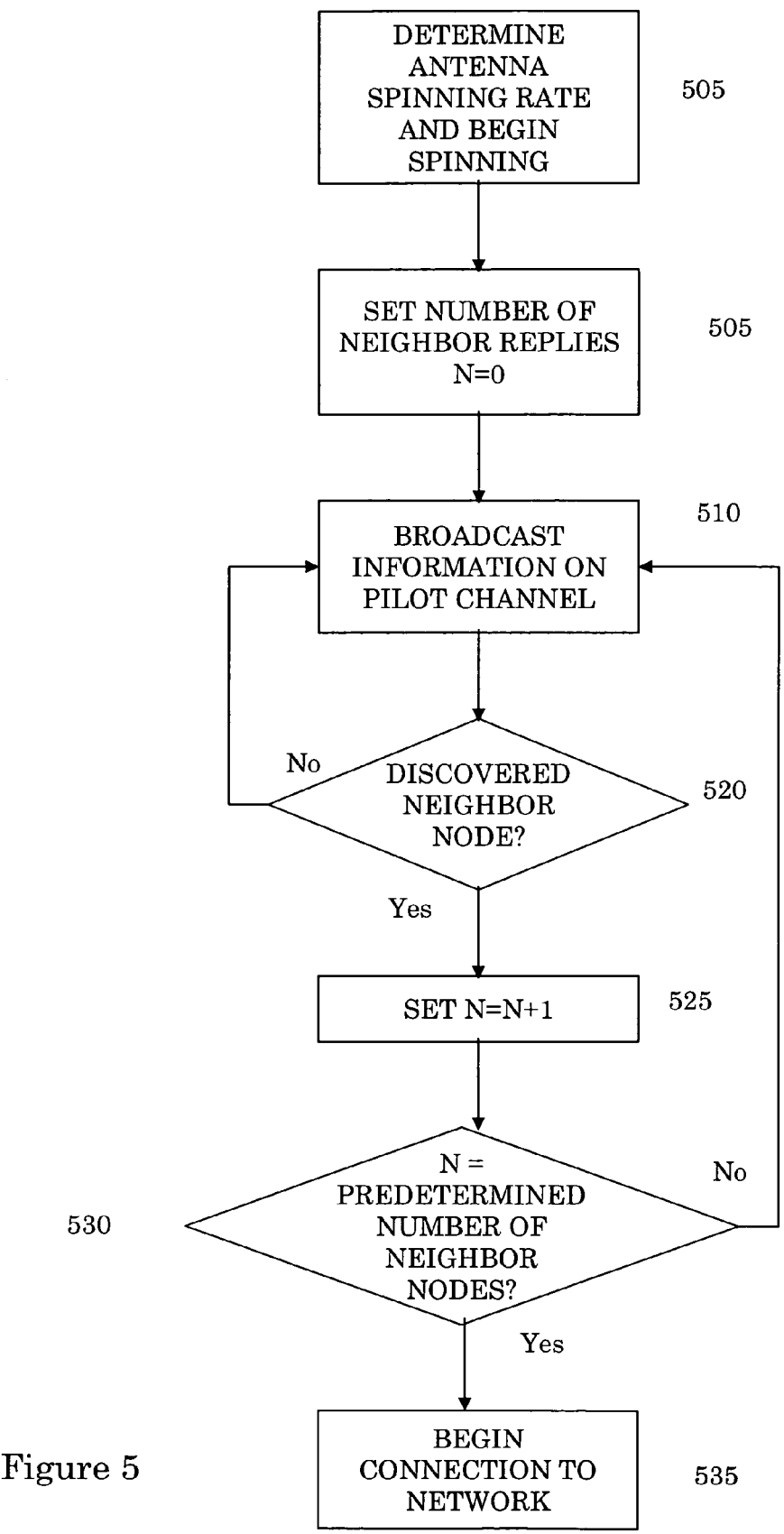
FIG. 5 illustrates an exemplary method for establishing a new participant node in a network.

FIG. 5 illustrates an exemplary method for initializing a new participant node in the network. Once a new participant node has been setup, i.e., once the antenna has been mounted and the controller powered up, the controller of the participant node determines an antenna spinning rate and begins spinning the antenna at the determined rate (step 505). Spinning of the antenna refers to electronically steering the antenna beam through a predetermined rotation, e.g., 360 degrees. Each new participant node randomly selects a spinning rate, which once determined, is fixed for the node. The new participant node sets a neighbor reply parameter N equal to zero (step 510).

While the node is spinning it broadcasts its node ID (NID) and relevant information such as the node's provisioning request on a pilot channel (step 515). In accordance with exemplary embodiments, the node ID is formed using the participant node's MAC address and a secret key shared by the participant node and the controlling node. The pilot channel can be a physically separate channel from the control and traffic channels or can be a logical channel sharing the same physical channel with the control and traffic channels. While the node is spinning it determines whether it has received any replies from neighbor participant nodes, i.e., whether it has discovered any neighbor nodes (step 520). If the new participant node has not discovered any neighbor participant nodes ("No" path out of decision step 520), then the new participant node continues to broadcast information on the pilot channel (step 515). If, however, the new participant node has discovered a neighbor node ("Yes" path out of decision step 520), then the new participant node stores information received in the reply from the discovered neighbor node and increments the neighbor reply parameter N by one (step 525).

The new participant node then determines whether the neighbor reply parameter N is equal to a predetermined number of neighbor participant nodes (step 530). The predetermined number of neighbor participant nodes can be selected such that the controlling node is provided with sufficient information to provide primary and alternate paths for the new participant node through the network. This number can be set to, for example, four neighbor participant nodes. If the neighbor participant node parameter N is not equal to the predetermined number of neighbor participant nodes ("No" path out of decision step 530), then the new participant node continues to broadcast information on the pilot channel (step 515). If, however, the neighbor participant node parameter N is equal to the predetermined number of neighbor participant nodes ("Yes" path out of decision step 530), then the new participant node begins its connection to the network (step 535).

The method discussed above in connection with FIG. 5 can also be used, with some modification, for participant nodes which have lost their connection to the network, such nodes being referred to as orphan participant nodes. The difference being that an orphan participant node would have determined its spinning rate when it was first established in the network, and hence, would employ this spinning rate while broadcasting information on the pilot channel. Moreover, leaf nodes can use the same procedures as orphan nodes in an attempt to discover another connection to the network. Additionally, other participant nodes will periodically transmit a timestamp, information about how to synchronize with the node, information about other transmission paths, and the transmission options for the node.

Figure 6:
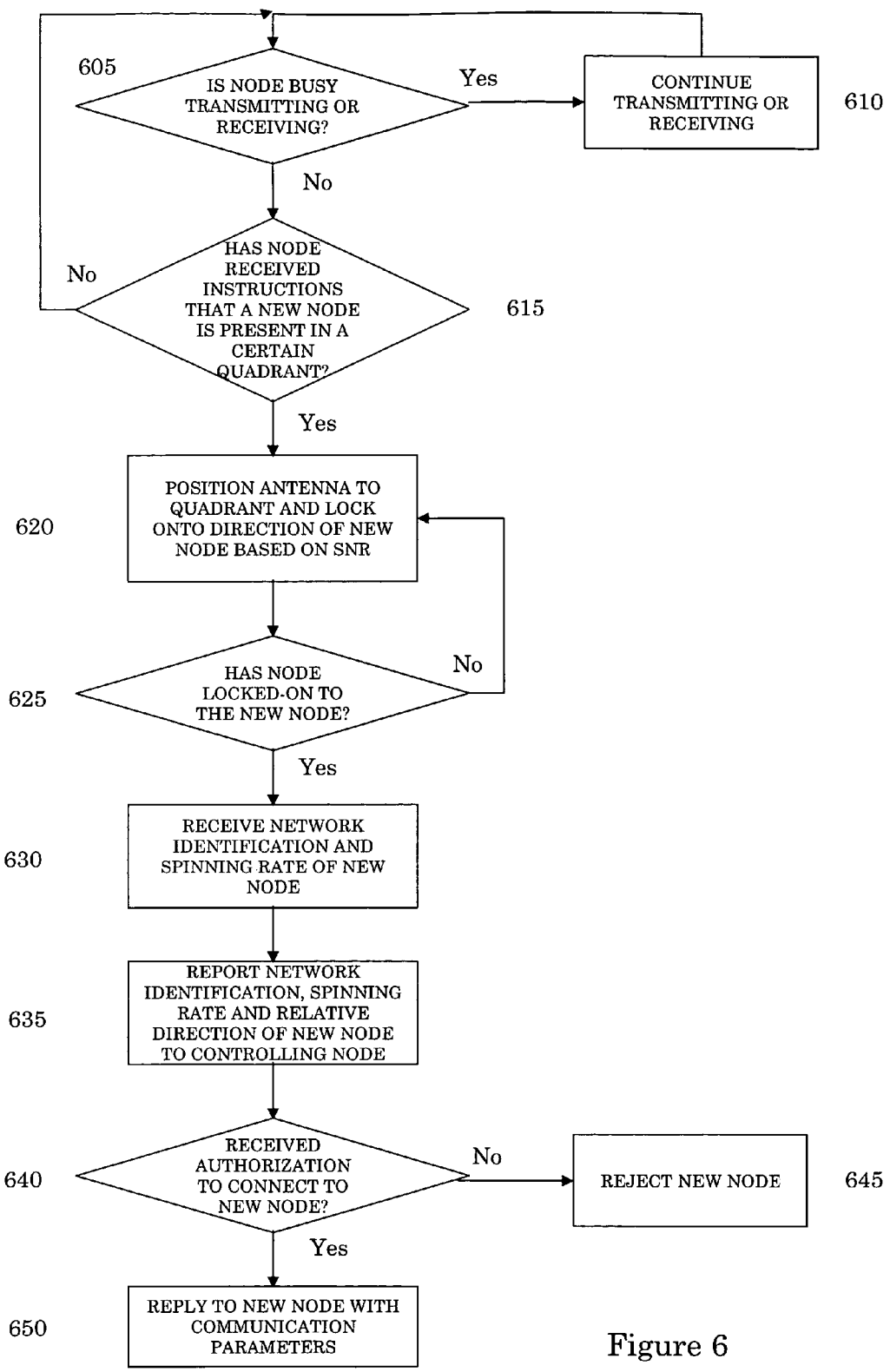
FIG. 6 illustrates an exemplary method for detecting new participant nodes by existing participant nodes.

FIG. 6 illustrates an exemplary method for detecting new nodes by existing participant nodes. A participant node scans for new nodes when it is not transmitting or receiving traffic. Accordingly, the participant node determines whether it is transmitting or receiving traffic (step 605). If the participant node is transmitting or receiving traffic ("Yes" path out of decision step 605), then the participant node continues to transmit or receive the traffic (step 610). If, however, the participant node is not busy transmitting or receiving traffic ("No" path out of decision step 605), then the participant node determines whether it has received instructions from the controlling node that a new node is present in a certain quadrant (step 615).

If the participant node has not received instructions that a new node is present in a certain quadrant ("No" path out of decision step 615), then the participant node continues its processing, such as determining whether there is traffic to transmit or receive (step 605). If, however, the participant node has received instructions that a new node is present in a certain quadrant ("Yes" path out of decision step 615), the participant node positions its antenna into the quadrant and attempts to lock-on to the direction of the new node based on a signal-to-noise ratio (step 620). Specifically, the participant node will scan the quadrant and take signal-to-noise ratio measurements at a plurality of locations within the quadrant, e.g., every 10 degrees within the quadrant. The location corresponding to the signal-to-noise ratio which is the highest among the measurements is selected as the direction of the new participant node. Until the participant node has found the location corresponding to the highest signal-to-noise ratio ("No" path out of decision step 625), the participant node continues to move its antenna through the quadrant in an attempt to lock-on to the new node (step 620).

If the participant node has locked-on to the new node ("Yes" path out of decision step 625), then the participant node receives the network identification and spinning rate of the new node (step 630). The participant node then reports the network identification, spinning rate and relative direction of the new node to the controlling node over the control channel (step 635).

The participant node determines whether it has received authorization from the controlling node to connect to the new node (step 640). When a new node is placed into the network the node ID of the new node is stored in the controlling node to provide security to the network by allowing only those nodes which are authorized to be a part of the network. Only those nodes which have their node ID stored in the controlling node are allowed to become a part of the network. Accordingly, if the participant node does not receive the authorization to connect to the new node within a predetermined amount of time ("No" path out of decision step 640), then the participant node rejects the new node by preventing the participant node from further attempts to lock-on to the new node.

If the participant node has received authorization to connect to the new node ("Yes" path out of decision step 640), then the participant node replies to the new node with communication parameters such as antenna pointing directions for transmission and reception of packets. The communication parameters can also include second and third antenna pointing directions for the transmission and reception of packets, the second and third antenna pointing directions are used by the new node when the first antenna pointing directions are not valid, i.e., when the link between the new node and the participant nodes corresponding to the pointing directions is not valid. If the participant node has packets to be transmitted or received the participant node will wait until there are no packets to be transmitted or received to send the communication parameters to the new node.

Although not illustrated in FIG. 6, if at any time during the process the participant node is to transmit or receive packets, the participant node will interrupt the procedure. The participant node can then resume the procedure once it has completed its transmission or reception. Additionally, the participant node may receive a message from the controlling node to terminate the process. This may occur when the controlling node has already received information from one or more other participant nodes which have locked-on to the new node.

To perform communications between two participant nodes requires an association process. Specifically, both participant nodes send an association request to each other, and require the other participant node to respond. Once both nodes have responded, both nodes will have the necessary association identification to identify themselves as partners. Re-association is not necessary because of the many-to-many architecture of the disclosed wireless network. However, when nodes have not heard from each other for a predetermined amount of time they may perform a de-association process.

Communications between nodes of the network can use a modification of the 802.11 protocols. If the network employs a single physical channel, the network can employ Network Allocation Vector (NAV) to guarantee that the data transfer operation is atomic in a contention environment, and that any other nodes will defer their request during the current node pairs' data transfer. However, if the network employs two or more physical channels, contention-based NAV can be used only in the process of scanning for nodes.

Ready To Send (RTS) is employed using RTS followed by a NAV timer counting-down. However, if two or more physical channels are employed it is not necessary to employ NAV, but instead this information is sent in the control channel and Clear To Send (CTS) is sent from a different physical channel from the control channel. After RTS, it is time to send the data. CTS is used to inform the sender that the receiver is ready. Once the receiver receives the data, an acknowledgement (ACK) is sent back to the sender. If two or more physical channels are employed the procedure can be modified so that after the first pair of RTS/CTS, the sender only expects the ACK from the receiver to send the next packet. If the sender finishes the data transfer, there will be a flag to tell the receiver that the transmission is complete. Because when two or more channel are used there is no contention for the carriers, and hence, Contention-Free Point Coordination Function (CF-PCF) can be employed. In this case the ACK may be replaced by a CF-ACK and a CF-End frame will be used for the end of transmission flag.

The network can provide Voice over Internet Protocol (VoIP) services by having the controlling node and the participant nodes manage Port Address Translation (PAT) and Network Address Translation (NAT) to allow the voice information to be delivered securely. Moreover, the controlling node include a VoIP switch to provide local and toll telephone services to all network participant nodes.

Although exemplary embodiments have been described in connection with providing voice, high-speed data, and video communications, features described above can be used in systems which provide only voice, high-speed data, video communications, or a combination of the three.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system comprising:
   a controlling node comprising an antenna and a controller;
   a plurality of participant nodes each comprising participant units, each participant node including an electronically steerable-beam antenna and a participant controller,
   wherein the controlling node, based on system topology information, provides each of the plurality of participant nodes with information on an antenna direction, wherein the antenna direction of one of the plurality of participant nodes allows transmission or reception of information directly from the electronically steerable-beam antenna of the one of the plurality of participant nodes to the electronically steerable-beam antenna of another one of the plurality of participant nodes,
   wherein the system topology information includes an amount of performance information as seen by each node forwarded by each of the plurality of participant nodes.

2. The system of claim 1, wherein the controlling node also provides a transmit power level to each of the plurality of nodes.

3. The system of claim 1, wherein information received by one of the plurality of participant nodes in a first physical direction is forwarded to another of the plurality of participant nodes in a second physical direction.

4. The system of claim 1, wherein the participant controller examines a label associated with each received packet to determine where to route the packet.

5. The system of claim 1, wherein the controlling node comprises a Voice over Internet Protocol (VoIP) switch, thereby providing telephone service to the plurality of participant nodes.

6. The system of claim 1, wherein the controlling node is connected to a telephone network, a data network and/or a video network.

7. A method for controlling a wireless network comprising:
   determining a topology of the network;
   providing, by a controlling node, first and second antenna pointing directions for each of a plurality of participant nodes of the network to achieve the determined network topology;
   receiving, by the controlling node, information from the plurality of participant nodes, the information identifying a communication parameter relative to each of the other participant nodes from which a particular participant node is able to receive signals; and
   reconfiguring the network based on the information, wherein the reconfiguration includes an identification of a new first and second antenna pointing directions for at least one of the plurality of participant nodes.

8. The method of claim 7, wherein the communication parameter is a signal-to-noise ratio.

9. The method of claim 7, wherein the reconfiguration is also based on an amount of traffic forwarded by each of the plurality of participant nodes.

10. The method of claim 7 further comprising:
    receiving a packet;
    examining a label of the packet; and
    determining where to route the packet based on the label.

11. The method of claim 7, wherein each of the plurality of participant nodes is assigned a subnet address, the method further comprising:
    receiving a packet by a participant node; and
    transmitting the packet based on a subnet address of the packet.

12. The method of claim 7 further comprising:

determining, by one of the plurality of participant nodes, that a connection with another participant node has been broken;

examining, by the one of the plurality of participant nodes, a control table; and changing the first or second antenna directions based on information in the control table.

13. In a network comprising a controlling node and first, second and third participant nodes, a method comprising:

transmitting a first packet from the first participant node in a first antenna direction to the second participant node;

determining that the second participant node did not receive the first packet; and transmitting the first packet in a second antenna direction to the third participant node based on information received from the controlling node or information stored in the first participant node, wherein the information stored in the first participant node was received from the controlling node, and wherein information received from the controlling node and the information stored in the first participant node includes the first and second antenna directions, and the first and second antenna directions are determined based on signal-to-noise ratio measurements.

14. The method of claim 13 further comprising:

determining by the second participant node that it cannot receive packets from the first participant node; and adjusting a direction of an antenna of the second participant node based on information received from the controlling node or information stored in the second participant node, wherein the direction of the antenna is a direction for receiving packets.

15. The method of claim 13 further comprising:

sending communication parameters from the first, second and third nodes to the controlling node; and providing, by the controlling node, information associated with the communication parameters to the first, second and third nodes.

16. The method of claim 15, wherein the information associated with the communication parameters is an antenna pointing direction, transmission power level, or a transmission frequency.

17. In a network comprising a controlling node and first and second participant nodes, a method comprising:

transmitting a first packet from the first participant node in a first antenna direction to the second participant node;

determining that the second participant node did not receive the first packet;

determining an adjusted communication parameter associated with the transmission of the first packet; and retransmitting the first packet using the adjusted communication parameter, wherein the adjusted communication parameter is received from the controlling node or is stored in the first participant node, wherein the adjusted communication parameter stored in the first participant node was received from the controlling node, wherein the adjusted communication parameter is a second antenna direction to a third participant node, and the first and second antenna directions are determined based on signal-to-noise ratio measurements.

18. The method of claim 17 further comprising:

reporting to the controlling node that the second participant node did not receive the first packet; and transmitting adjusted communication parameters from the controlling node to the first and second nodes based on the report.

* * * * *